United States Patent
Lindenmeier

(10) Patent No.: US 7,127,218 B2
(45) Date of Patent: Oct. 24, 2006

(54) SCANNING ANTENNA DIVERSITY SYSTEM FOR FM RADIO FOR VEHICLES

(75) Inventor: Heinz Lindenmeier, Planegg (DE)

(73) Assignee: Fuba Automotive GmbH & Co. KG, Bad Salzdetfurth (DE)

( * ) Notice: Subject to any disclaimer, the term of this patent is extended or adjusted under 35 U.S.C. 154(b) by 277 days.

(21) Appl. No.: 10/768,529

(22) Filed: Jan. 30, 2004

(65) Prior Publication Data
US 2004/0198274 A1 Oct. 7, 2004

(30) Foreign Application Priority Data
Feb. 4, 2003 (DE) .............................. 103 04 431

(51) Int. Cl.
H04B 1/02 (2006.01)
H04B 1/00 (2006.01)
H04B 1/06 (2006.01)
H04M 1/00 (2006.01)

(52) U.S. Cl. .................. 455/101; 455/63.1; 455/161.3; 455/277.2; 455/575.7; 375/346; 375/347; 343/725; 343/729; 343/757; 342/381; 342/420

(58) Field of Classification Search ................ 455/130, 455/131, 161.1, 161.2, 167.1, 101, 107, 114.2, 455/115.1–115.4, 226.1–226.4, 269, 272, 455/277.2, 278.1, 283, 334, 337
See application file for complete search history.

(56) References Cited

U.S. PATENT DOCUMENTS

| | | | |
|---|---|---|---|
| 5,204,979 A * | 4/1993 | Schenkyr et al. ........ | 455/276.1 |
| 6,169,888 B1 * | 1/2001 | Lindenmeier et al. ... | 455/277.2 |
| 6,430,404 B1 * | 8/2002 | Lindenmeier et al. ...... | 455/132 |
| 6,611,677 B1 * | 8/2003 | Lindenmeier et al. ...... | 455/135 |
| 6,925,293 B1 * | 8/2005 | Lindenmeier et al. ... | 455/276.1 |
| 7,010,048 B1 * | 3/2006 | Shattil ........................ | 375/259 |

FOREIGN PATENT DOCUMENTS

| | | |
|---|---|---|
| DE | 357247 | 11/1986 |
| DE | 4403612 | 8/1995 |
| DE | 10102616 | 8/2001 |

* cited by examiner

Primary Examiner—Edward F. Urban
Assistant Examiner—Thuan T. Nguyen
(74) Attorney, Agent, or Firm—Collard & Roe, P.C.

(57) ABSTRACT

A scanning antenna diversity system for mobile FM radio having an antenna system with controllable logic switch, wherein a different high-frequency reception signal is passed to a receiver. An IF signal turns on a diversity processor, which switches the logic switch into a different switching position in response to reception interference. The diversity processor has two interference detectors whose signals are passed to a logic circuit for evaluation and to produce a logic control signal, so that a different switching positions are selected at the earliest possible time after the occurrence of interference in the reception signal.

33 Claims, 9 Drawing Sheets

SCANNING ANTENNA DIVERSITY SYSTEM FOR FM RADIO FOR VEHICLES

BACKGROUND OF THE INVENTION

1. Field of the Invention

The invention relates to a scanning antenna diversity system for FM radio for vehicles, having an antenna system with a controllable logic switching device, in which a different high-frequency reception signal, in terms of diversity, is passed to a receiver with different switching positions, in each instance, and an intermediate frequency signal derived from this reception signal turns on a diversity processor, which switches the logic switching device into different switching position if there is reception interference.

2. The Prior Art

Switching arrangements for antenna systems are generally known from German patents DE 35 17 247 A1, and DE 101 02 616 A1. In the case of the antenna diversity reception systems for the elimination of interference during the reception of frequency-modulated radio broadcasts described there, a number of antenna signals are passed to a diversity processor, wherein a selected antenna signal is switched through to the receiver at any point in time. This high-frequency signal is converted to the intermediate frequency range (IF) in the receiver, and this IF signal is passed to the diversity processor for the recognition of interference. If interference is recognized, switching signals for switching to a different antenna signal are derived in the diversity processor. In this way, audio-frequency interference caused by multi-path reception can be avoided, if adequate signal reception conditions are present.

The scanning antenna diversity systems of the prior art, such as that known from German Patent DE 44 03 612, receive interference at an antenna due to the superimposition of several partial waves having different amplitudes, phase differences and time differences at the reception location. The resulting level collapses are correlated with frequency interference dispersion peaks, and cause undesirable linear signal distortions as a function of the modulation content in the audio frequency range. If a certain predetermined frequency interference dispersion peak is exceeded, i.e. if an interference-related amplitude modulation is exceeded, the system's interference detector recognizes interference directly, and causes a switch to be made to another available antenna signal, or to a different linear combination formed in an antenna matrix. In this manner, all of the available RF signals are checked for interference and switched through to the receiver, one after the other. The interference energy taken up during the interference recognition time becomes audible, and further reduces the audio signal quality as this search process repeats itself in rapid sequence, and more interference energy falls into the audio channel due to an extended interference recognition time. Therefore the interference recognition time must be made as short as possible. These processors indicate the interference particularly accurately if they are set for simultaneity of the interference in the frequency deviation and the interference amplitude modulation Prior art diversity processors having a momentary interference indicator, recognize interference if, for example, the frequency deviation threshold or the amplitude interference modulation threshold is exceeded. Noise interference is recognized in the momentary interference indicator only if the actual momentary value exceeds the predetermined threshold by which the interference is being measured. The minimal interference recognition time for a sudden interference that exceeds the predetermined thresholds, e.g. on the basis of adjacent channel, same channel, or intermodulation interference, is limited by the bandwidth of the intermediate frequency channel in processors of this type, and amounts to 30 to 50 µs. An interference recognition time of <100 µs can therefore be assured. For interference intervals of the high-frequency carrier, or intermediate-frequency carrier, at values between 6 dB and 12 dB, the actual value of a frequency deviation of 75 kHz, for example, is connected with undesirable long recognition times.

Particularly in the case of stereo reception, such $(S/N)_{IF}$ values acoustically already result in a clearly noisy signal and are significantly too long to achieve a satisfactory diversity function for this operating state. In the case a prior art interference detector, it is therefore practical if the frequency deviation threshold is regulated as a function of the actual average frequency deviation, in accordance with frequency modulation. Even in the case of slight average frequency deviations (e.g. program contents having a low volume) and a frequency deviation threshold regulated to 40 kHz, for example, the response time is typically 500 µs at a signal of $(S/N)_{IF}=9$ dB and typically 10 ms at $(S/N)_{IF}=12$ dB. There are therefore reception situations in which the actual reception signal is clearly noisy, and the interference detector is too slow in time in order to recognize interference, and switch the high-frequency reception signal to a better reception signal. These response times all exceed the tolerable measure for guaranteeing perfect reception behavior in the presence of a noisy signal. It is true that the bandwidth of the IF channel is large enough so that the aforementioned interference caused by adjacent channel, same channel, or intermodulation interference can be recognized at a sufficiently early point in time, but because of the particular statistical properties of a noisy signal, an interference detector of this type is suitable for the recognition of noise only under certain conditions.

SUMMARY OF THE INVENTION

It is therefore an object of the invention, in the case of a scanning antenna diversity system for FM radio for vehicles, to shorten the interference recognition time for the sudden occurrence of a noisy reception signal, as compared with the state of the art and, in this connection, to improve the subjectively perceived listening signal quality with regard to the dynamic behavior of the scanning antenna diversity system, in an economically efficient manner.

This task is accomplished by a scanning antenna diversity system for FM radio for vehicles, having an antenna system with a controllable logic switching device in which a different high-frequency reception signal, in terms of diversity, is passed to a receiver with different switching positions, in each instance. An IF reception signal derived from this reception signal turns on a diversity processor, which switches the logic switching device into a different switching position if there is reception interference. The diversity processor has a first interference detector, whose momentary interference indicator signal is obtained without delay from the momentary value, in terms of time, of the IF reception signal of the receiver, limited to the IF bandwidth, by means of determining the interference-related occurrence of impermissible momentary values of the frequency and the amplitude of this signal. There is also provided a second interference detector, whose interference indicator signal is obtained from the same IF reception signal but from time-integral determination of the interference signal contents in frequency gaps kept free of the wanted signal according to the signal standardization of the FM multiplex signals of the FM demodulated IF reception signal. The two interference indicator signals are then passed to a logic circuit which generates a logic control signal. This signal controls the antenna logic switching system so that a different switching position is selected at the earliest possible point in time after interference occurs in the reception signal.

It is advantageous to design the diversity processor of the system to recognize the noisy signal in a time that is significantly shorter than with the momentary interference indicator signal of the prior art interference detector. This is particularly important in the case of signals in which the noise component is still disruptive, but the signal is already clearly audible. This advantage can be achieved in extremely efficient manner by means of using a further detector according to the invention. Other antenna diversity scanning systems work with several antenna signals that are received at the same time by converting them into the intermediate frequency range and subsequently making the phases equal. These methods result in an improvement of the signal/noise ratio, but are extremely complicated, since conversion to the intermediate frequency range is required twice, and is limited to the use of only two antenna signals. The result achieved with the present arrangement is that the noise in the signal is practically no longer perceived, because it is recognized at a sufficiently early time after it occurs, and therefore the antenna signals are switched over in a technically simple and economically efficient manner.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
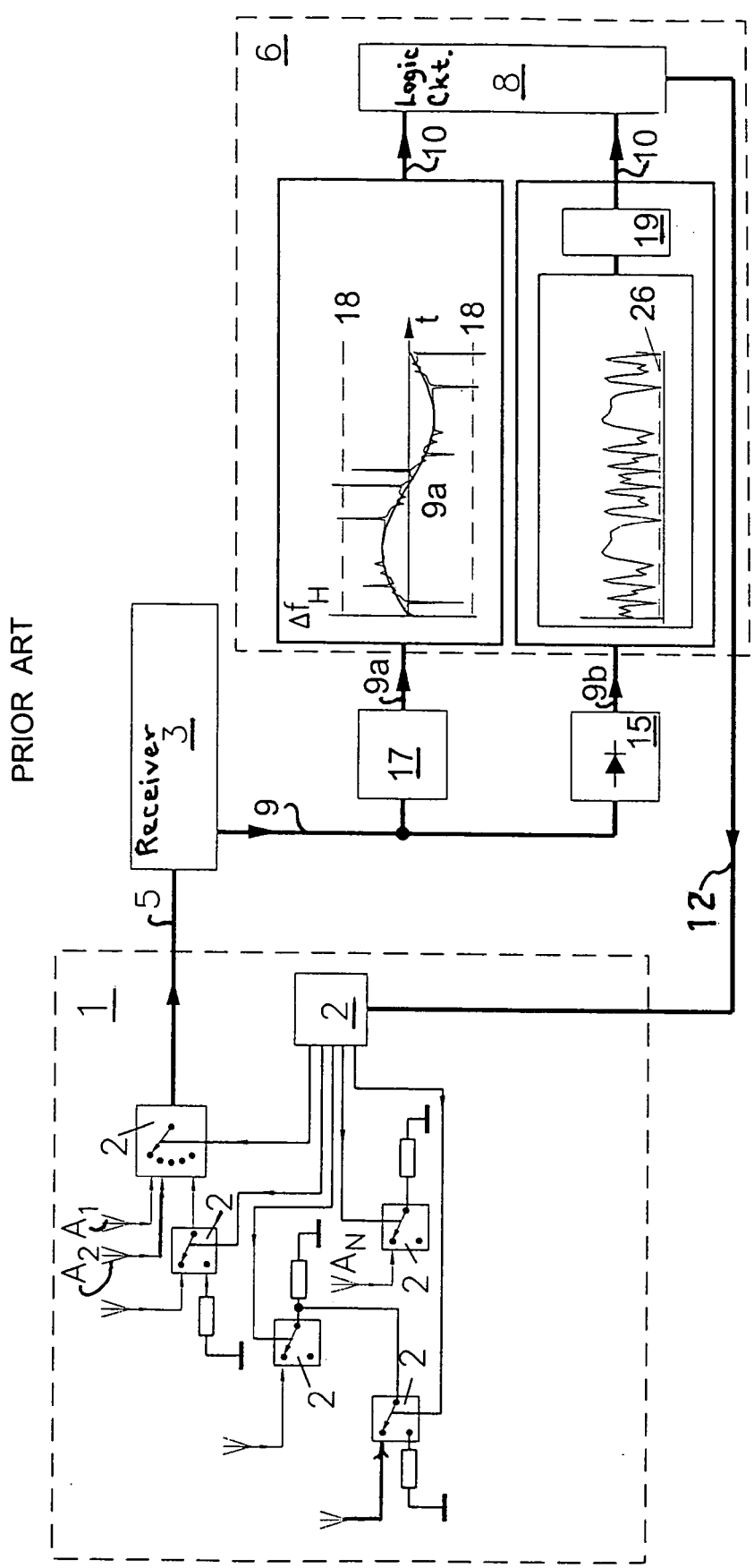
FIG. 1 shows a scanning antenna diversity system according to the state of the art.

Referring to FIG. 1 there is shown a scanning antenna diversity systems of the prior art, such as that known from German Patent DE 44 03 612, for FM radio for vehicles, having an antenna system (1) with a controllable logic switching device (2), in which a different high-frequency reception signal (5), in terms of diversity, is passed to a receiver (3) with different switching positions. An IF reception signal (9) derived from this reception signal (5) at the output of receiver 3 turns on a diversity processor (4), which switches the logic switching device (2) into a different switching position if there is reception interference. The diversity processor has a first interference detector (6) whose momentary interference indicator signal (10) is obtained without delay from the momentary value, in terms of time, of the IF reception signal (9) of the receiver (3), which is limited to the IF bandwidth, by means of determining the interference-related occurrence of impermissible momentary values of the frequency and the amplitude of this signal.

The interference received at antenna 1 due to the superimposition of several partial waves having different amplitudes, phase differences and time differences cause undesirable linear signal distortions as a function of the modulation content in the audio frequency range. If a certain predetermined frequency interference dispersion peak is exceeded, i.e. if an interference-related amplitude modulation is exceeded, the system's interference detector recognizes interference directly, and causes a switch to be made to another available antenna signal, or to a different linear combination formed in an antenna matrix. In this manner, all of the available RF signals are checked for interference and switched through to the receiver, one after the other. The interference energy taken up during the interference recognition time becomes audible, and further reduces the audio signal quality as this search process repeats itself in rapid sequence, and more interference energy falls into the audio channel due to an extended interference recognition time. Therefore, the interference recognition time must be made as short as possible. These processors indicate the interference particularly accurately if they are set for simultaneity of the interference in the frequency deviation and the interference amplitude modulation. In such systems, the diversity processor of the type TEA 6101 from the Philips company is frequently used as a rapidly indicating interference detector.

Prior art diversity processors such as the system of FIG. 1 have a momentary interference indicator, and recognize interference if, for example, the frequency deviation threshold at the output of demodulator 17 or the amplitude interference modulation threshold at the output of detector 15 is exceeded. Noise interference is recognized in the momentary interference indicator only if the actual momentary value exceeds the predetermined threshold by which the interference is being measured. The minimal interference recognition time for a sudden interference that exceeds the predetermined thresholds, e.g. on the basis of adjacent channel, same channel, or intermodulation interference, is limited by the bandwidth of the intermediate frequency channel in processors of this type, and amounts to 30 to 50 μs. An interference recognition time of <100 μs can therefore be assured. For interference intervals of the high-frequency carrier, or intermediate-frequency carrier, at values between 6 dB and 12 dB, the actual value of a frequency deviation of 75 kHz, for example, is connected with long recognition times.

Figure 2A:
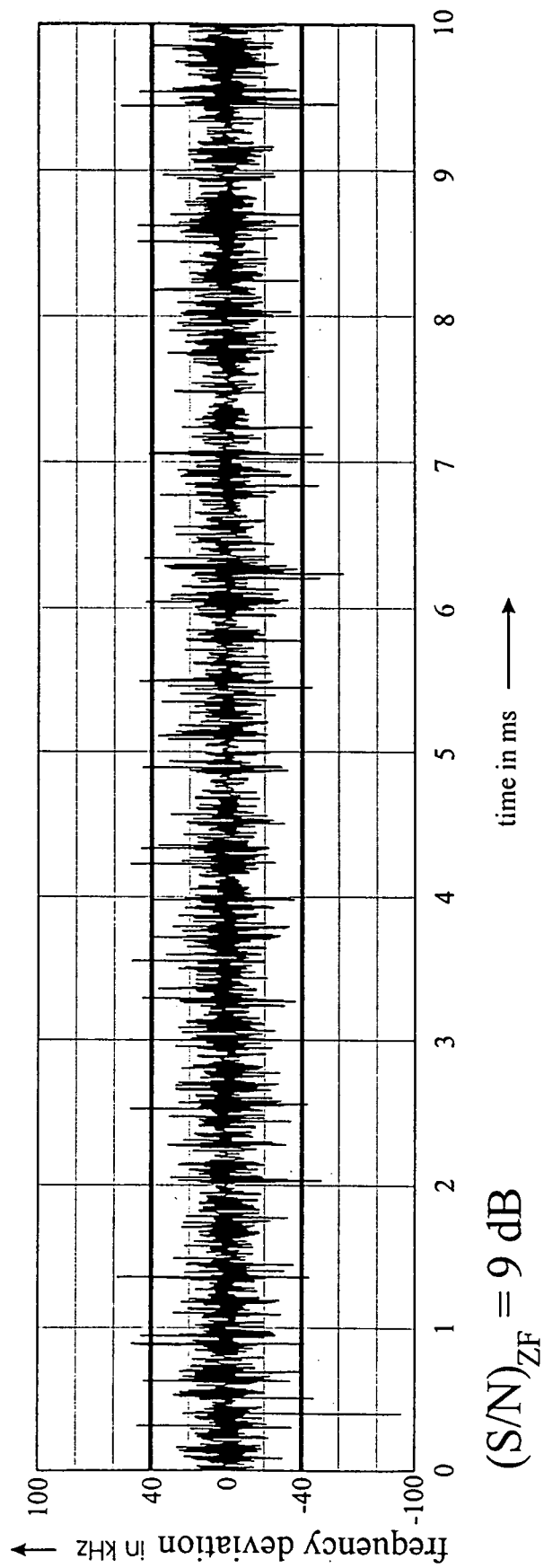
FIG. 2a shows a frequency deviation as a function of time for a $(S/N)_{IF}=9$ dB.
Figure 2B:
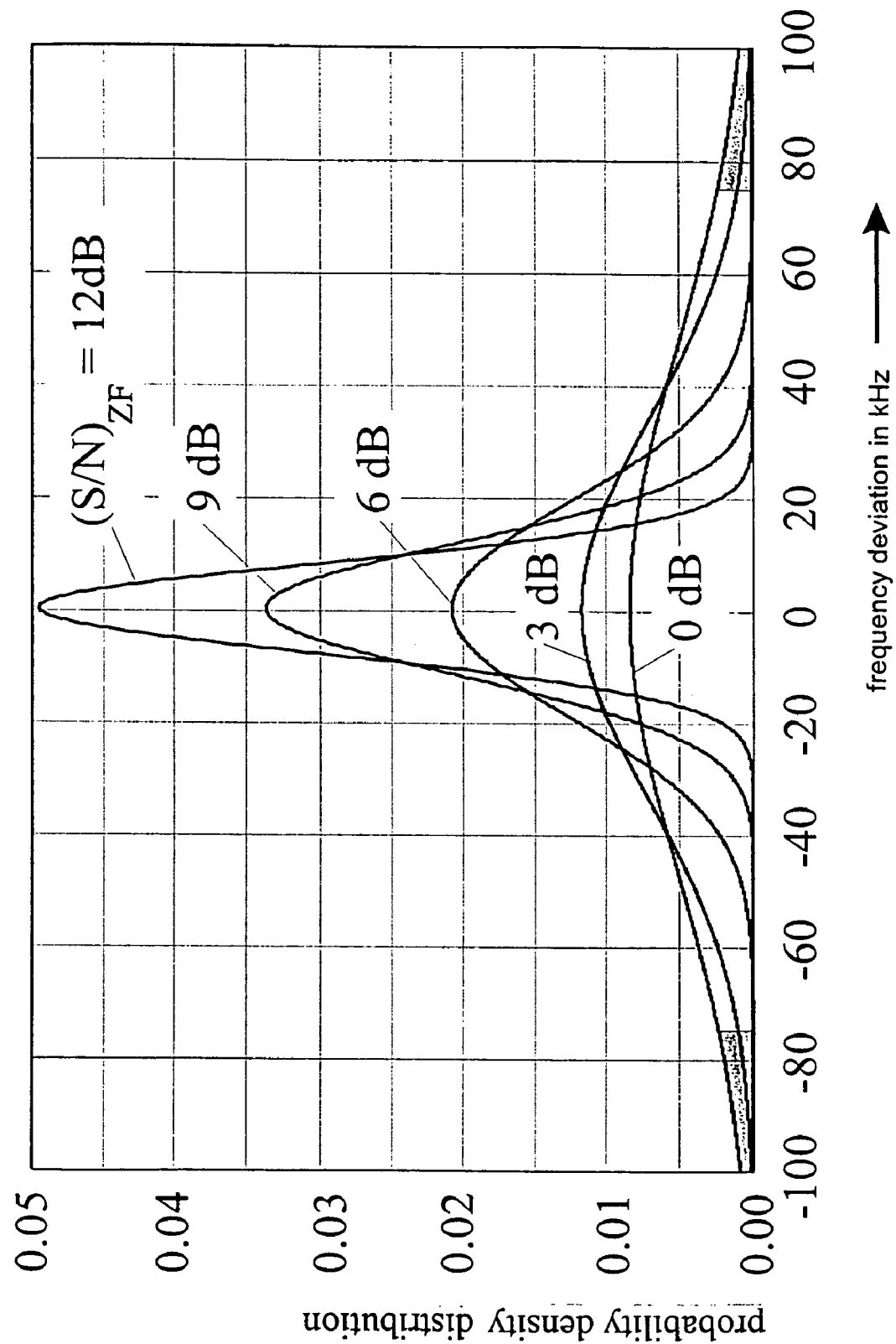
FIG. 2b shows a probability density distribution of the frequency deviation for different signal/noise ratios in the IF level.
Figure 2C:
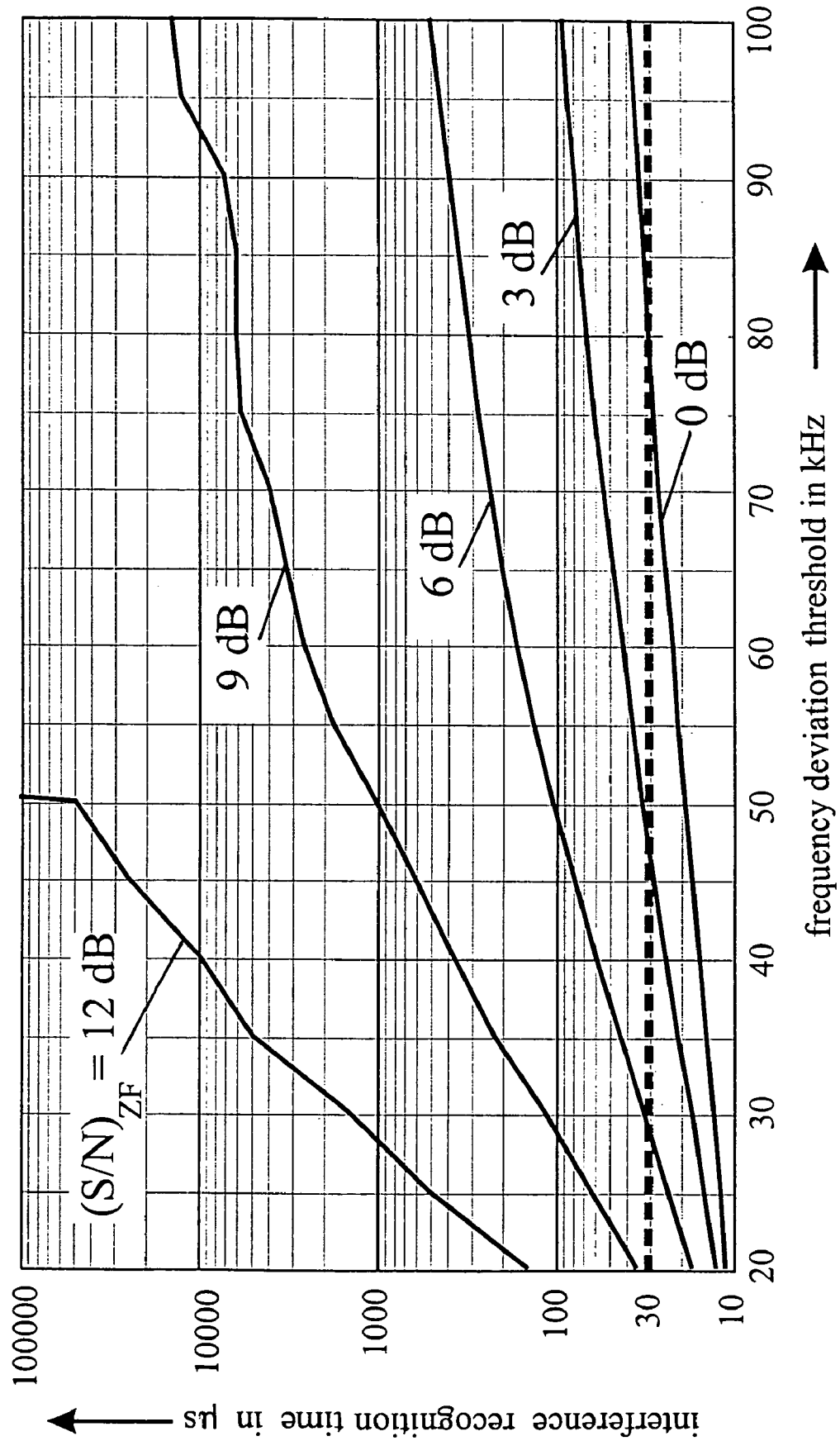
FIG. 2c shows an interference recognition time as a function of the frequency deviation for different signal/noise ratios.

These recognition times are shown in FIG. 2c, for different signal/noise intervals between 0 dB≦(S/N)$_{IF}$≦12 dB, as a function of the frequency deviation threshold 18 set in the processor. Particularly in the case of stereo reception, such (S/N)$_{IF}$ values acoustically already result in a clearly noisy signal. In this connection, it has been shown that because of the decreasing probability of the occurrence of great frequency variations caused by the momentary value of the noise, the response time of such a first interference detector 6 takes on high values. The broken line in FIG. 2c characterizes the expected response time of 30 µs, and the average response times for exceeding a frequency deviation threshold 18 of 75 kHz reaches values of 60 µs at (S/N)$_{IF}$ of 3 dB, and increases to 6 ms at (S/N)$_{IF}$ of 9 dB. At a signal/noise distance of 12 dB, the response time, at clearly greater than 100 ms, is significantly too long to achieve a satisfactory diversity function for this operating state. In the case of a first interference detector 6 in FIG. 1 according to the state of the art, it is therefore practical if the frequency deviation threshold 18 is regulated as a function of the actual average frequency deviation, in accordance with frequency modulation. Even in the case of slight average frequency deviations (e.g. program contents having a low volume) and a frequency deviation threshold 18 regulated to 40 kHz, for example, the response time is typically 500 µs at a signal of (S/N)$_{IF}$ 9 dB and typically 10 ms at (S/N)$_{IF}$=12 dB. There are therefore reception situations in which the actual reception signal is clearly noisy, and the first interference detector 6 needs too long a time in order to recognize interference and cause a switch of the high-frequency reception signal 5 to be made to a better reception signal. These response times all exceed the tolerable measure for guaranteeing perfect reception behavior in the presence of a noisy signal. It is true that the bandwidth of the IF channel is large enough so that the aforementioned interference caused by adjacent channel, same channel, or intermodulation interference can be recognized at a sufficiently early point in time, but because of the particular statistical properties of a noisy signal, an interference detector of this type is suitable for the recognition of noise only under certain conditions.

To illustrate the surprising phenomenon that the recognition period for a noisy signal becomes greater with an improving signal/noise ratio, reference is made to the representations in FIG. 2a and FIG. 2b. FIG. 2a shows the frequency interference deviation, caused by noise, of a noisy carrier oscillation for (S/N)$_{IF}$=9 dB. The average time span between frequency interference deviations that exceed the threshold of 40 kHz in pulse-like manner is approximately 0.4 ms, in this connection, and it is evident that the corresponding time spans would already be significantly greater at a threshold of 50 kHz. These time spans increase with an increasing signal/noise ratio, in such a manner that during the observation period of 10 ms that is shown, the frequency interference variation caused by noise does not even reach the maximal frequency deviation of 75 kHz that is predetermined by standardization for a wanted signal. Observation over a longer period of time produces the result that the average value of this time span is approximately 6 ms, as is evident from FIG. 2c. Observation thus shows that the recognition time of the noise interference is also random, and can also be significantly longer than the average value indicates. To further illustrate the reduction in the probability that a frequency deviation of 75 kHz of a noisy IF carrier oscillation will be exceeded, FIG. 2b shows the probability density distribution of the frequency deviation. The areas of the curve for (S/N)$_{IF}$=0 dB that have a gray background, and their continuation beyond the region shown, indicate the probability that exceeding this value will occur. The great decrease in the corresponding areas of the other functions shown allows the strong drop in the probability of exceeding the value with an increasing (S/N)$_{IF}$ to be recognized, and makes the related increase in the average interference recognition time according to FIG. 2c clear. Thus, the subjectively perceived listening signal quality with regard to the dynamic behavior of the scanning antenna diversity system, is greatly improved in an economically efficient manner.

Figure 3:
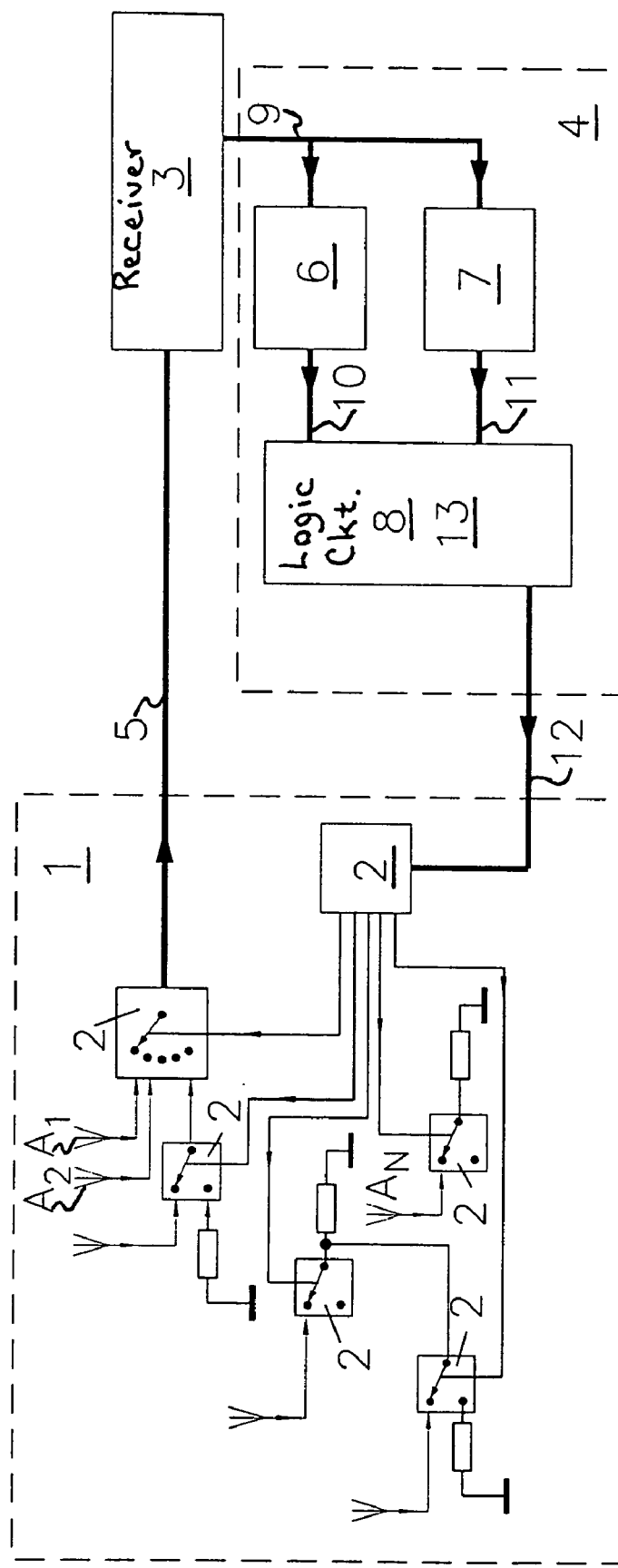
FIG. 3 shows a scanning antenna diversity system according to the invention.

Referring to FIG. 3 there is shown a scanning antenna diversity system having a controllable logic switching device (2), in which a different high-frequency reception signal (5), in terms of diversity, is passed to a receiver (3) with different switching positions. An IF reception signal (9) derived from reception signal (5) turns on a diversity processor (4), which switches the logical switching device (2) into a different switching position if there is reception interference.

The diversity processor 4 of this diversity system, according to the invention, has two detectors. The first interference detector 6, produces a momentary interference indicator signal 10 without delay from the momentary value of the IF reception signal 9, which is limited to the IF bandwidth, by means of determining the interference-related occurrence of impermissible momentary values of both the frequency and the amplitude of this signal. There is a second interference detector 7, also coupled to receiver 3, and whose interference indicator signal 11 is obtained from the same IF reception signal 9, but from time-integral determination of the interference signal contents in frequency gaps, kept free of the wanted signal, according to the signal standardization of the FM multiplex signals of the FM demodulated IF reception signal 9a. The two interference indicator signals 10, and 11, are passed to a logic circuit 8, to produce at its output, a logic control signal 12.

In logic circuit 8, momentary interference indicator signal 10 and interference indicator signal 11 are evaluated accordingly, in such a manner that even if noise interference occurs, the signal that recognizes the noise interference first, either momentary interference indicator signal 10 or interference indicator 11, causes the logic switching device 2 to be switched to a different switching position, by way of the logic circuit 8 and the logic control signal 12, and thereby a different high-frequency reception signal 5, in terms of diversity, is applied.

Logic switching device 2 is controlled by the logic control signal 12, so that either a command to switch to the next position yields a sequentially new high-frequency reception signal 5 to receiver 3 or, in an advantageous embodiment of the proposed invention, is equipped with addressable switching positions, so that the logic control signal 12 is configured as an address signal, so that a specially selected high-frequency reception signal 5 is switched through to receiver 3 with every switching command, e.g. in that different antennas are switched with dummy elements.

Figure 4:
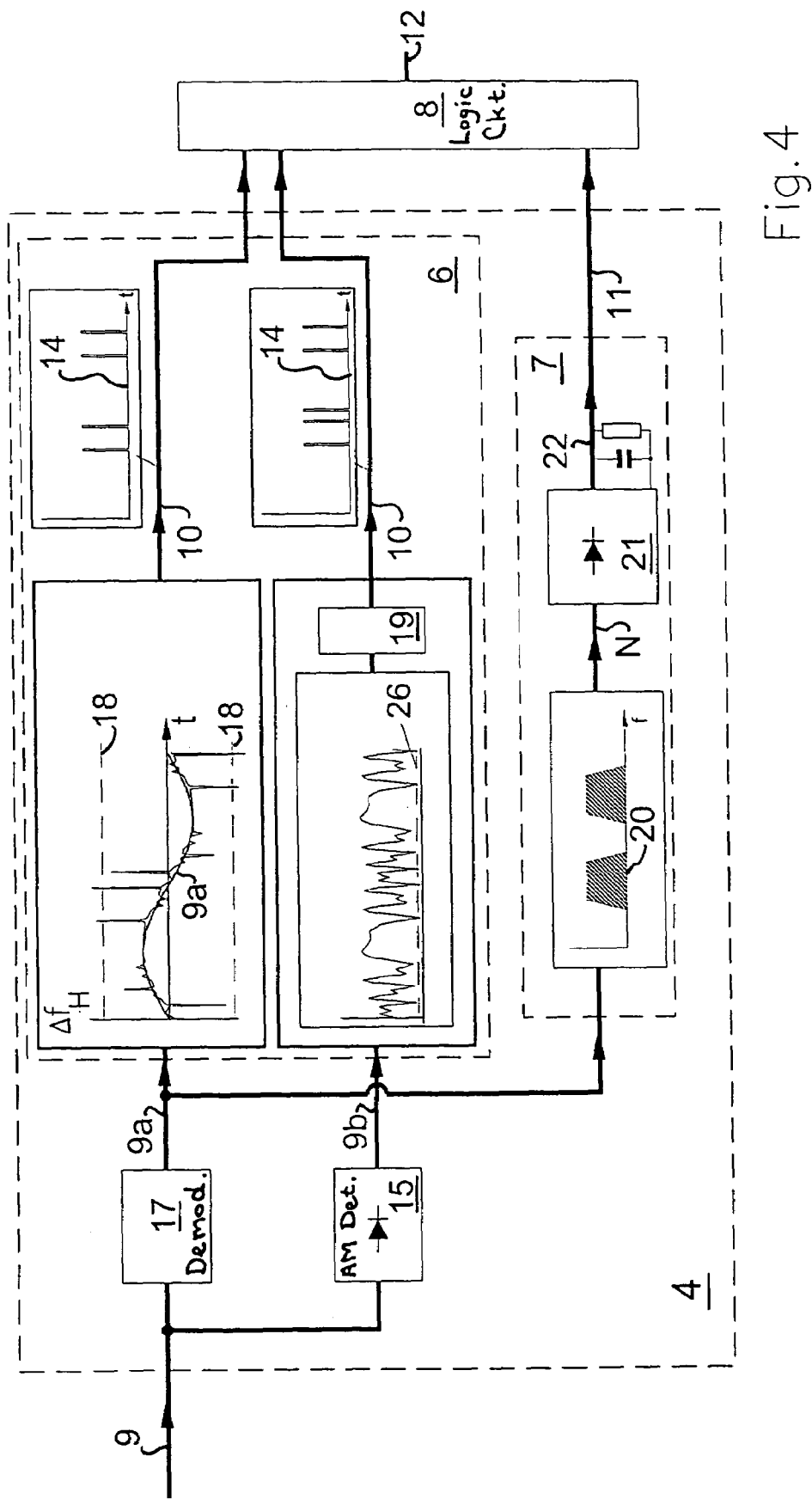
FIG. 4 shows a scanning antenna diversity system according to the invention, having second interference detector for evaluating the interference signals.

FIG. 4 shows diversity processor 4 in greater detail, with a combination of a rapidly indicating first interference detector 6, as well as the second interference detector 7. An FM demodulator 17 connected to output 9 of receiver 3 is contained in the diversity processor 4, and its output signal is measured by way of a decider at the frequency deviation threshold 18, so that if the permissible frequency deviation is exceeded, momentary interference indicator signal 10 is present as a binary signal 14. The first pulse that occurs in the binary signal 14 after the occurrence of interference is therefore the earliest possible point in time for determining a frequency deviation interference. In similar manner, the same IF reception signal 9 can be rectified with the AM rectifier 15, and the IF reception signal 9 can be examined for amplitude collapses and whether the permissible amplitude interference modulation threshold 26 has been exceeded, using a interference amplitude modulation indicator 19 connected to the output of AM rectifier 15. First interference detector 6 is particularly effective in providing a momentary indication to recognize interference if both a pulse caused by exceeding the frequency deviation threshold 18, and a pulse caused by exceeding the amplitude interference modulation threshold 26 occur at the same time, which takes place in the circuit of FIG. 4 in an equivalent manner, and fed to logic circuit 8.

The output signals of the first interference detector 6 are passed to logic circuit 8 as momentary interference indicator signals 10, and can be evaluated there for reporting interference, by way of a logic control signal 12. Because of the situation that noise interference produces a momentary interference indicator signal 10 only when noise peaks occur, and therefore too late for signals with only weak noise, because of their rarity, a second interference detector 7 is provided to supplement first interference detector 6 where second interference detector 7, indicates the interference even in the case of signals having little noise, within the shortest possible period of time. According to the present invention, second interference detector 7 evaluates the interference energy in frequency ranges that should be free of energy according to signal standardization of the FM multiplex signal of FM demodulated IF reception signal 9a.

Figure 5:
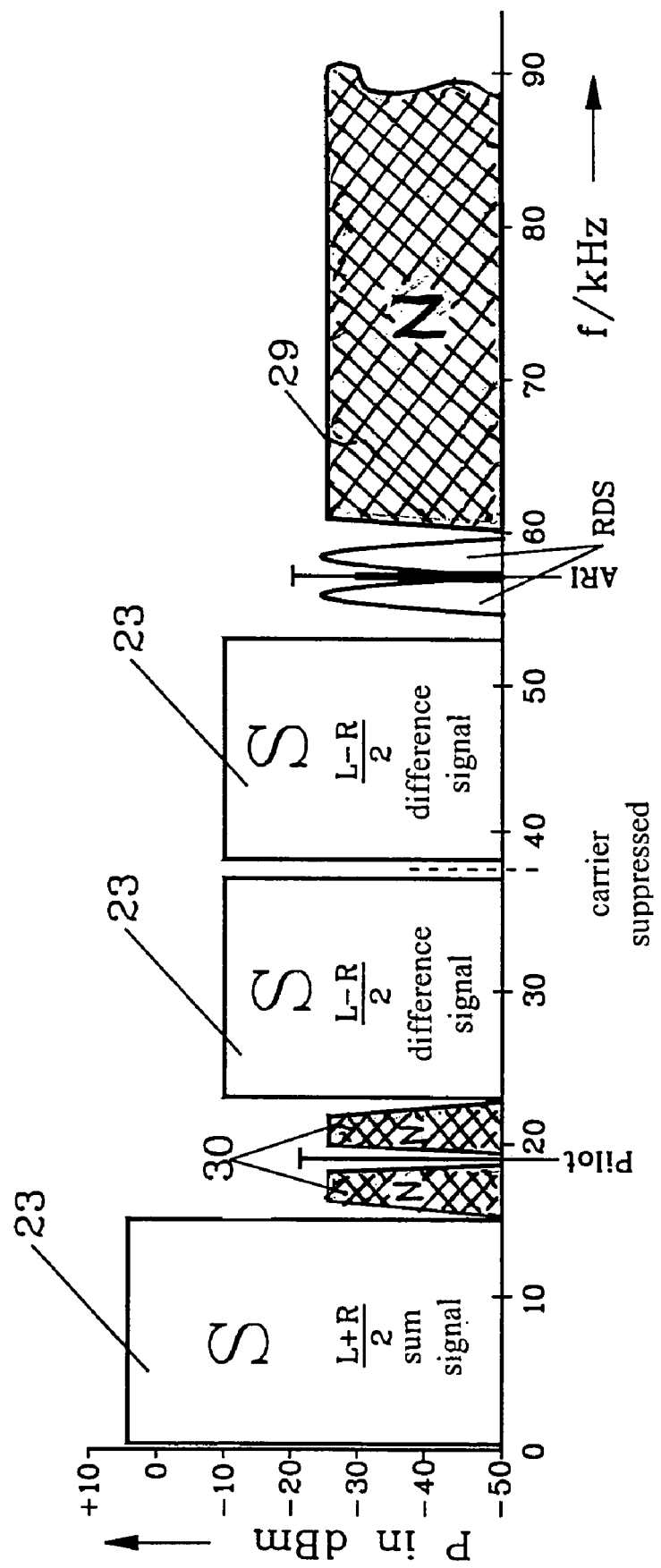
FIG. 5 shows a frequency assignment of the standardized stereo multiplex signal with additional signals that contain the interference signal.

The FM multiplex signal is shown with the additional signals in FIG. 5. It is true that the bandwidth of these frequency gaps, "N" is significantly less than the total IF bandwidth, so that an evaluation of the interference signals contained therein is restricted with regard to the detection time. The advantage of the interference determination in these frequency gaps, however, is that it can take place without the presence of the signal, and therefore separate from it. This is in contrast to the method of operation of a detector having the design of first interference detector 6, in which interference can only be detected if the momentary total signal deviates by an intolerable degree, either by a frequency deviation or by carrier amplitude. The determination of the interference takes place, according to the invention (FIG. 4) by means of rectification of the signals in these frequency gaps, using the rectifier circuit 21, followed by integration element 22, with a suitably selected time constant. At the available bandwidths of the frequency gaps, interference detectors of this type achieve a recognition time for interference that occurs in these frequency gaps of approximately Dt=1 to 5 ms.

In the evaluation of the interference signals in the frequency range above 60 kHz, recognition times Dt<1 ms can be achieved, because of the greater available bandwidth. The reliable adherence to this recognition time is due to the time-integral detection of the interference signal contents in frequency gaps kept free of the wanted signal, according to the signal standardization of the FM multiplex signal of the FM demodulated IF reception signal 9a. The time-integral detection, after rectification of this signal results in adding evaluation of the frequency deviation, independent of its momentary value, if noise occurs suddenly. The evaluation is therefore not dependent on the statistical occurrence of a frequency deviation that exceeds a predetermined threshold, which occurs according to a certain probability, as is the case in first interference detector 6. Instead, all the interference signals are added up and can be used, depending on the application, as a measure of the average interference, such as if a predetermined threshold is reached, as an interference signal indicated in binary manner, or as an average value at integration element 22 with a time constant. Second interference detector 7, which is presumed to be slower because of its time-integrating property, can, if a noisy signal suddenly occurs, respond more quickly, by several orders of magnitude, than interference detector 6, which is presumed to be fast, with its momentary interference indicator signal 10, which is tied to a frequency deviation threshold 18 that may be exceeded for a moment. Using the present invention, it is therefore contrary to expectations to configure a diversity processor 4 by adding the interference detector type that is presumed to work slowly to the interference detector type that is presumed to work quickly, where this processor allows the shortest possible recognition time for all types of interference, even including signals with weak noise.

A comparison with the recognition times for interference in the first interference detector shown in FIG. 2c, and a maximal frequency deviation threshold therefore results in a significantly shorter recognition time for noise interference with a $(S/N)_{HF}-(S/N)_{IF}>9$ dB. The resulting interference indicator 11 is also passed on to logic circuit 8, in which a logic control signal 12 is produced for the selection of a different high-frequency reception signal 5 at the earliest possible point in time and, in practice, with sufficient speed. Moreover, the interference that occurs in the frequency gaps is not caused only by noise, but also by linear distortions of the wanted signal in these frequency areas. These occur, for example, due to frequency-dependent group running times, which occur in the multi-path reception area, particularly due to the superimposition of electromagnetic waves having running times that are different and cannot be ignored.

To evaluate the interference N in FIG. 5, according to the invention, the frequency range that is between the frequency range for the sum signal and the frequency range for the difference channel is suitable. Moreover, the frequency range above the frequency range for the different channel, i.e. above the RDS channel, or in other words above approximately 60 kHz, is suitable.

Figure 6:
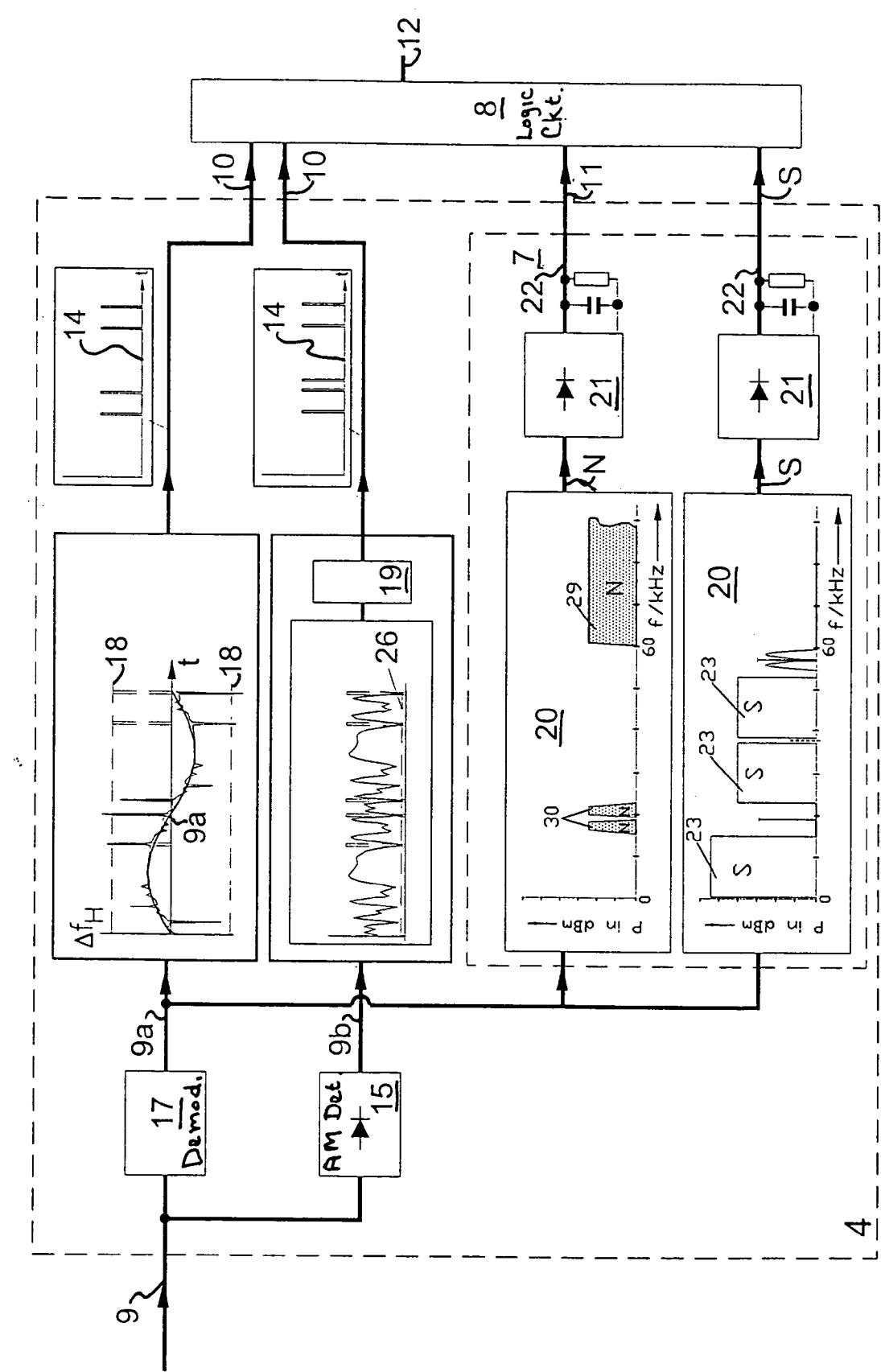
FIG. 6 shows a scanning antenna diversity system according to FIG. 4, with an additional evaluation of the wanted signal using signal filters to form the S/N ratio close to the audio frequency range.

In the circuit of FIG. 6, it is practical if the uncoupling of the interference contents N takes place above 60 kHz, in filter 20, using a high-pass filter 29, and that uncoupling of the frequency range between approximately 15 kHz and 23 kHz takes place using a band-pass 30 with a frequency trap for the pilot tone (19 kHz). Using a combined diversity processor 4 as shown in the circuit of FIG. 6, according to the invention, the wanted signal contents S are additionally obtained from the frequency ranges configured for the wanted signal according to the signal standardization of the FM multiplex signal of the FM demodulated IF reception signal 9a, using wanted signal filters 23 in frequency filter 20. Using a rectifier circuit 21 coupled to the output of filter 20, followed by integration element 22 with a suitable time constant, in each instance, both the wanted signal energy S and the interference contents N are then separately available, so that the signal/noise ratio S/N can be determined and is available in logic circuit 8, as a measure for the assessment of the audio signal quality 16. Using the interference indicator 11 of second interference detector 7 or the momentary interference indicator signal 10 of first interference detector 6, each structured using analog technology, a signal/noise ratio threshold 24 can be present in the computer program when using a programmable microprocessor 13 with A/D conversion on the input side, for the logic circuit 8, on the basis of which the program sequence is selected, which evaluates the momentary interference indicator 10 and the interference indicator 11 according to size and time elapsed, in order to configure switch-over commands using the logic control signal 12, with the logic linking of these assessments.

Figure 7:
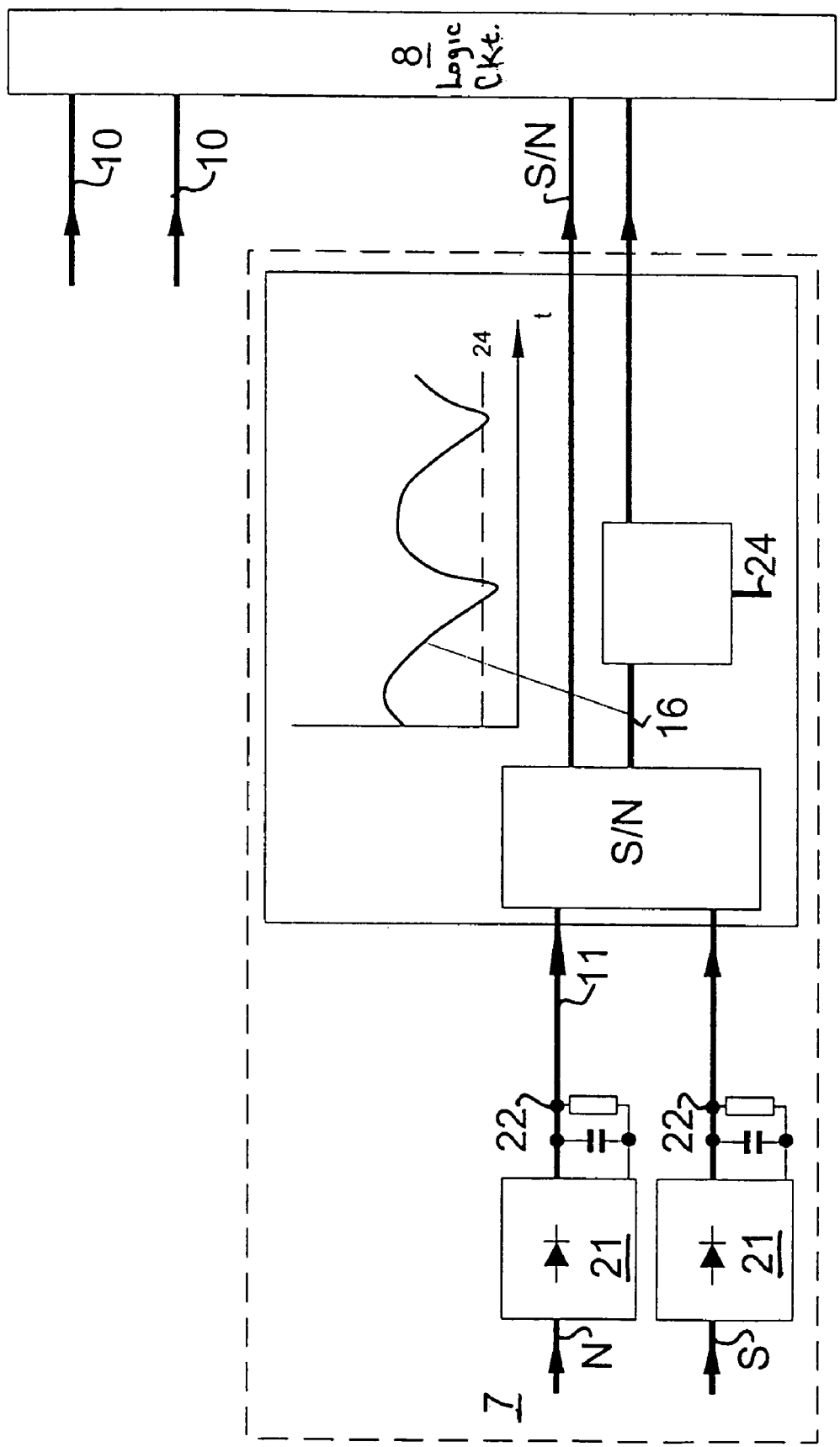
FIG. 7 shows a scanning antenna diversity system according to FIG. 6, with additional analog S/N determination and evaluation of the audio quality using a predetermined signal/noise ratio threshold to control different operating modes.

In FIG. 7 there is shown another exemplary embodiment of second interference detector 7, wherein the S/N formation takes place in a block that works in analog manner, at the output of which the signal for the audio signal quality 16 is present, whereby the binary information with regard to whether a predetermined signal/noise ratio threshold 24 was exceeded is determined at a subsequent decider, and a corresponding signal is issued to logic circuit 8.

In a particularly advantageous embodiment of the present invention, the indicators of second interference detector 7 are used to control different operating modes of the diversity system. In this connection, the signal/noise ratio S/N determined using second interference detector 7 is used to monitor the audio signal quality 16 and to switch among different operating modes of the system.

If high-frequency reception signal 5 changes too frequently in areas that are characterized by overly weak signal levels or overly great running time differences of the incident waves in the Rayleigh reception field, a clearly perceptible interference signal in the form of "crackling" is superimposed on the reception signal on the LF level. This impression of interference is dependent, for example, on the driving speed of the vehicle, but can particularly be clearly perceived in a standing vehicle and is annoying, because the driving noises that are otherwise present while driving are eliminated. The demand with regard to audio quality is therefore not as great because of the driving noises, such as wind noises or noises caused by the road surface, as well as engine noises. These moving sounds partly cover these "crackling noises," more than when driving slow.

In a particularly advantageous embodiment of the invention, the signal/noise ratio S/N that is present in the microprocessor 13 for program control, which ratio represents the audio signal quality 16, is therefore used to monitor the dynamic control of the scanning antenna diversity system. The indicator speed for the signal/noise ratio S/N of second interference detector 7 is completely sufficient for this control, even at the greatest driving speed, in the FM-Rayleigh reception field.

In an exemplary advantageous embodiment of this control, the following operating modes are described:

Well Supplied Radio Reception Areas:

(Sufficient Average Audio Signal Quality 16, the Signal/Noise Ratio is Sufficiently Great, on the Average.)

Interference Indicator Mode:

In the interference indicator mode, first interference detector 6, with its momentary interference indicator 10, causes a switch to a different predetermined high-frequency reception signal 5 if the frequency deviation threshold 18 and/or the amplitude interference modulation threshold 26 is/are exceeded; likewise, a switch takes place if the signal/noise ratio S/N goes momentarily below the signal/noise ratio threshold 24 by means of an interference indicator 11 by second interference detector 7, at time $t_1$, but only if first interference detector 6 has not indicated any interference during the time period $t_1-Dt<t<t_1$, whereby Dt is the recognition time of the second interference detector 7.

Updating Cycle:

The system is switched in the interference indicator mode described above, and the available high-frequency reception signals 5 are cyclically selected, and a) the audio signal quality is determined during the turn-on time of a signal, in each instance, using second interference detector 7, and stored in the memory of microprocessor 13, and sorted by quality, so that a ranking of the high-frequency reception signals 5 is formed, or b) the audio signal quality 16 is determined using the measured time lengths, i.e. the turn-on times of the high-frequency reception signal 5 that is turned on, in each instance, and the evaluation of the turn-on time as audio quality, and these are stored in the memory of microprocessor 13 for the individual signals, and sorted by quality, so that a ranking of the high-frequency reception signals 5 is formed.

Signal Detection Mode:

The system is switched in the above interference indicator mode and the available high-frequency reception signals 5 are selected from the ranking so that the signal with the best audio signal quality 16, in each instance, is selected when a switch takes place.

Momentary Turn-On Mode:

An advantageous program sequence results in that the system is operated in the signal selection mode and is interrupted by the updating cycle at suitably selected time intervals 28, and after this cycle has been run through, the signal selection mode is activated again. In an advantageous embodiment of the invention, time intervals 28 are adapted to the changing amplitude of the high-frequency reception signal 5, which changes as a result of the driving speed, according to the Rayleigh field distribution, and are selected to be shorter at an increasing driving speed. In another advantageous embodiment of the invention, time intervals 28 are derived from the time intervals between signal switches that are determined, so that if shorter time intervals are determined, smaller time intervals 28 are set for more frequent updating of the ranking of the high-frequency reception signals 5.

Poorly Supplied Radio Reception Areas:

(The Audio Signal Quality 16 is not Sufficient, the Signal/Noise Ratio is Too Small, on the Average.)

S/N Mode:

In such reception areas, interference detectors such as first interference detector 6 have the tendency to indicate interference too frequently. In these cases, it is frequently advantageous to configure logic circuit 8 in such a manner that when an inadequate audio signal quality 16, averaged over time, is determined by second interference detector 7, in combination with momentary interference indicator signals 10 that follow one another at very small time intervals, the latter are ignored when forming the logic control signal 12, and the logic control signal 12 is exclusively derived from the interference indicator 11 of second interference detector 7.

S/N Updating Cycle:

The system is switched in the S/N mode described above, and the available high-frequency reception signals 5 are cyclically selected, and the control of the system can advantageously take place analogous to the updating cycle a) indicated above, or b) on the basis of the audio signal quality.

S/N Signal Detection Mode:

The system is switched in the above S/N mode and the available high-frequency reception signals 5 are selected from the ranking so that the signal with the best audio signal quality 16, in each instance, is selected when a switch takes place.

S/N Switching Mode:

If the average signal/noise ratio S/N is too small, it is advantageous to set a program sequence that is analogous to the momentary turn-on mode described above, in which the system is operated in the S/N signal selection mode, and is interrupted by the S/N updating cycle at suitably selected time intervals 28, and after this cycle has been run through, the S/N signal selection mode is activated again. Time intervals 28 are suitably selected, as described above, and dynamically adjusted, if necessary.

Accordingly, while only a few embodiments of the present invention have been shown and described, it is obvious that many changes and modifications may be made thereunto without departing from the spirit and scope of the invention.

What is claimed is:

1. A scanning antenna diversity system for FM radio for vehicles, having an antenna system having a controllable logic switching device, in which a different high-frequency reception signal, in terms of diversity, is passed to a receiver with different switching positions, in each instance, and an IF reception signal at the output of the receiver derived from this reception signal is coupled to the input of a diversity processor, which switches the logic switching device into a different switching position if there is reception interference, wherein the diversity processor comprises;

a first interference detector having its input coupled to the IF reception signal (5), and whose momentary interference indicator signal at its output is obtained without delay from a momentary value, in terms of time, of the IF reception signal of the receiver, which is limited to the IF bandwidth, by means of determining the interference-related occurrence of impermissible momentary values of the frequency and the amplitude of this signal, a second interference detector having its input coupled to the IF reception signal whose interference indicator signal at its output is obtained from the same IF reception signal, but from a time-integral determination of the interference signal contents in frequency gaps kept free of the wanted signal according to the signal standardization of the FM multiplex signals of the FM demodulated IF reception signal (9a); and, a logic circuit coupled to the output of said first and second interference detectors for receiving said two interference indicator signals and producing at its output a logic control signal that is connected to the controllable logic switching device for controlling the antenna system, said logic circuit evaluating said interference indicator signals of the two interference detectors, so that a different switching position is selected at the earliest possible point in time after the occurrence of a reception signal that has become unworthy of reception.

2. The scanning antenna diversity system according to claim 1, wherein said logic circuit comprises a programmable microprocessor whose sequence program is built up upon the evaluation of the interference indicator signals according to size and time sequence, taking into consideration their known different characteristics with regard to the different interference causes, and logic links these assessments to provide the switching commands in said logic control signal.

3. The scanning antenna diversity system according to claim 2 wherein said two interference detectors are structured using analog technology, and that the momentary interference indicator of said first interference detector, obtained from the FM demodulated IF reception signal and said interference indicator of said second interference detector, after analog/digital conversion, are evaluated in said programmable microprocessor that functions digitally, in accordance with a suitably configured protocol, to form said logic control signal.

4. The scanning antenna diversity system according to claim 2, where said first interference detector comprises an FM demodulator having a frequency deviation threshold, and an AM rectifier having an interference amplitude modulation indicator wherein said momentary interference indicator signal is formed from the simultaneous occurrence of the interference-related frequency deviation and the amplitude interference modulation.

5. The scanning antenna diversity system according to claim 2, wherein in said first interference detector, the momentary interference indicator signal is given as a binary signal and that the frequency deviation threshold is structured in variable manner, in such a manner that it is set as a function of the actual modulation stroke that is averaged, over time, by way of a suitably set integration time, and is raised according to a predetermined function with an increasing modulation stroke.

6. Scanning antenna diversity system according to claim 5, wherein said first interference detector has an amplitude interference modulation threshold signal and said interference indicator signal are provided as a binary signal if this threshold is exceeded, and said momentary interference indicator signal is given as a binary signal by means of the simultaneous occurrence that the frequency deviation threshold and the amplitude interference modulation threshold have been exceeded.

7. The scanning antenna diversity system according to claim 6, wherein said amplitude interference modulation threshold is configured to be variable, so that it is set as a function of the actual AM demodulated IF reception signal of the IF reception signal, averaged by way of a suitably set integration time, and that said amplitude interference modulation threshold is raised according to a predetermined function, with an increasing size of this signal.

8. The scanning antenna diversity system according to claim 5 wherein the time intervals between consecutive intervals of exceeding the frequency deviation threshold or/and the amplitude interference modulation threshold in said first interference detector are detected in said logic circuit and are used as a criterion for the quality of the high-frequency reception signal, and that the frequency deviation threshold or/and the amplitude interference modulation threshold is/are raised as the time intervals become shorter, in order to reduce the switching unrest.

9. The scanning antenna diversity system according to claim 5 wherein the actual time averages of the FM demodulated IF reception signal and the AM demodulated IF reception signal are passed to said microprocessor to be A/D converted, and signals are generated, using a computer program and subsequent D/A conversion, which are passed to said first interference detector for controlling the frequency deviation threshold and the amplitude interference modulation threshold.

10. The scanning antenna diversity system according to claim 1, wherein said first interference detector, includes an FM demodulator having a frequency deviation threshold that corresponds to the maximally permissible frequency deviation for the high-frequency reception signal without interference, said momentary interference indicator signal being formed from the momentary frequency deviation that exceeds the frequency deviation threshold, as a result of the occurrence of a frequency deviation in the total signal, within an interference recognition time $t_s$ of maximally only a small multiple of the reciprocal IF bandwidth, at $t_s<100$ μs.

11. The scanning antenna diversity system according to claim 1, comprising an AM rectifier coupled to the input said first interference detector and an interference amplitude modulation indicator in the first interference detector, said momentary interference indicator signal being formed from the occurrence of an amplitude interference modulation in the total signal, within an interference recognition time $t_s$ of maximally only a small multiple of the reciprocal IF bandwidth, at $t_s<100$ μs.

12. The scanning antenna diversity system according to claim 1, wherein said second interference detector comprises at least one frequency filter for uncoupling of interference signals in a frequency gap that is kept free of the wanted signal, according to the signal standardization of the FM multiplex signal of the FM demodulated IF reception signal, and that the interference energy contained in the interference signals is evaluated by means of time integration, to form said interference indicator signal, within a time of $t_q<10$ ms.

13. The scanning antenna diversity system according to claim 12, wherein said frequency filter is configured as a high-pass filter for uncoupling interference signals in the frequency range above the highest frequency that occurs in the standardized FM multiplex signal, the lower limit frequency of which is selected to be sufficiently low to detect all interference, and the flank steepness of which is selected to be sufficiently high to suppress the wanted signal content at the filter output.

14. The scanning antenna diversity system according to claim 12, wherein said frequency filter comprises a combined filter, consisting of band-pass filters in the pass-through frequency ranges 15 kHz<f<19 kHz and 19 kHz<f<23 kHz, as well as of a high-pass filter with 57 kHz<f.

15. The scanning antenna diversity system according to claim 12, wherein said frequency filter for evaluation of the interference signals in the frequency ranges 15 kHz<f<19 kHz and 19 kHz<f<23 kHz is formed by frequency conversion with a carrier oscillation on the pilot frequency, with a subsequent low-pass filter with the limit frequency of <4 kHz.

16. The scanning antenna diversity system according to claim 12, wherein said second interference detector comprises a rectifier circuit with integration element coupled to the output of said at least one frequency filter for evaluation of the interference energy N that occurs in the interference signals.

17. The scanning antenna diversity system according to claim 16, comprising a signal/noise ratio threshold circuit having a predetermined threshold, and coupled to the output of said integration element, and said logic circuit is programmed so that if the signal/noise ratio S/N has gone below this threshold value, said threshold circuit generates a logic control signal at the time point $t_1$, which causes the antenna logic switching device to be switched further only if said first interference detector has not indicated any interference during the time interval $t_1-Dt<t<t_1$, whereby Dt is given by the recognition time of said second interference detector.

18. The scanning antenna diversity system according to claim 17 wherein when the system works in a signal selection mode, addressable switching states are provided in the logic switching device, and during operation of the system according to claim 13, for the different switching states, the actual time intervals between the subsequent switching processes of the logic switching device for the different switching states are separately determined as a criterion for the quality of the high-frequency reception signal, and the logic circuit is configured as a microprocessor having memory and sorting functions, by means of which a ranking of the high-frequency reception signals assigned to the addressable switching states is formed, with regard to the quality of these signals, and if a momentary interference indicator signal or an interference indicator signal occurs, a next switching state is selected, by an appropriately generated address signal corresponding to the next position in the ranking.

19. The scanning antenna diversity system according to claim 18 wherein for the different switching states, the audio quality is separately determined from the signal/noise ratio S/N determined in said second interference detector, and that this signal is used to monitor the audio quality and to switch between different operating modes of the scanning antenna diversity system as a criterion of the quality of the high-frequency reception signal, and that the ranking of the high-frequency signals assigned to the addressable switching states is formed with regard to the quality of these signals.

20. The scanning antenna diversity system according to claim 18 wherein the system works in an updating mode, wherein the addressable switching states are cyclically switched further to a different addressable switching state every time a momentary interference indicator signal occurs in said first interference detector or an interference indicator signal occurs in the second interference detector, in order to update the ranking, until all the addressable switching states have been selected and the actual time intervals have been reliably determined at least once.

21. The scanning antenna diversity system according to claim 20, wherein said logic circuit is programmed so that if the audio quality that is averaged over time and found to be sufficient by said second interference detector, the diversity system is operated in a momentary switching mode, consisting of a combination of, said signal selection mode controlled by said first interference detector, which is interrupted by said updating cycle at suitably selected time intervals and, the signal selection mode which is reactivated after this cycle has been run.

22. The scanning antenna diversity system according to claim 21, wherein the time intervals are adapted to the changing amplitude of the high-frequency reception signal that changes with the driving speed, according to the Rayleigh field distribution, and are selected to be shorter with an increasing driving speed.

23. The scanning antenna diversity system according to claim 22, wherein the time intervals are derived from the time intervals determined according to claims 17, 20, and 22, so that at the shortest determined time intervals, smaller time intervals are set for more frequent updating of the ranking of the high-frequency reception signals.

24. The scanning antenna diversity system according to claim 21, wherein in the S/N mode, the FM demodulated IF reception signal or the AM demodulated IF reception signal is passed to said first interference detector for dynamic adjustment of the frequency deviation threshold, or of the amplitude interference modulation threshold, respectively, for the purpose of making available updated thresholds for the transition to the momentary switching mode.

25. The scanning antenna diversity system according to claim 17, wherein a signal corresponding to the perceived audio quality is produced from the signal/noise ratio S/N determined in said second interference detector, and that this signal is used to monitor the audio quality and to switch between different operating modes of the scanning antenna diversity system.

26. The scanning antenna diversity system according to claim 25, wherein the logic circuit is configured so that if the audio quality averaged over time, is found to be too low by said second interference detector, in combination with time intervals between the consecutive instances of exceeding the frequency deviation threshold or/and the amplitude interference threshold in said first interference detector, the diversity system is operated in the S/N mode in which the momentary interference indicator signals are left out of consideration in forming the logic control signal, and said logic control signal is exclusively derived from said interference indicator signal of said second interference detector.

27. The scanning antenna diversity system according to claim 26, wherein the system is operated in S/N mode, and works in an S/N signal selection mode in which addressable switching states are provided in the logic switching device, and the actual signal/noise ratio S/N of the different switching states is separately determined for the different switching states as a criterion of the audio quality of the high-frequency reception signal, and said logic circuit is structured as a microprocessor having memory and sorting functions, which are used to form a ranking of the high-frequency reception signals assigned to the addressable switching states, with regard to the audio quality of these signals, and if an interference indicator signal occurs, where the value goes below a signal/noise ratio threshold, a next switching state is selected by an appropriately generated address signal, corresponding to the next position in the ranking.

28. The scanning antenna diversity system according to claim 27, wherein the system works in a S/N mode wherein said logic circuit is programmed so that if the audio quality that is averaged over time by said second interference detector, in combination with momentary interference indicator signals that follow one another at very small time intervals, these momentary signals are ignored when the logic control signal is formed, and in an S/N updating cycle, in which the addressable switching states are cyclically switched further to a different addressable switching state, whenever an interference indicator signal occurs in said second interference detector, until all the addressable switching states have been selected and the actual signal/noise ratios S/N have been reliably determined at least once.

29. The scanning antenna diversity system according to claim 28, wherein the diversity system is operated in a S/N switching mode, whereby a combination of the S/N signal selection mode controlled by said second interference detector, which is interrupted by the S/N updating cycle, at suitably selected time intervals, and after this cycle has been run, the S/N signal selection mode is reactivated.

30. The scanning antenna diversity system according to claim 12, wherein said at least one frequency filter includes a wanted signal filter for uncoupling wanted signal contents S from said FM demodulated IF reception signal on frequencies provided for the transmission of wanted signals, according to the signal standardization of the FM multiplex signal of said FM demodulated IF reception signal, for time-integral determination of the wanted signal energy S, and that the signal/noise ratio S/N is determined in a time of $t_q < 10$ ms after occurrence of the interference and included in the formation of said logic control signal.

31. The scanning antenna diversity system according to claim 1 wherein said first interference detector is a processor of the type TEA 6101 of the Philips Company, or having a similar specification.

32. The scanning antenna diversity system according to claim 1, wherein said logic circuit is programmed so that in order to prevent undesirable additional switching activity after a switch instruction has been issued to the logic switching device by said logic control signal, a waiting time is in effect, within which no further switching instructions are passed on to the logic switching device, and which is slightly greater than the sum of the delay time resulting from the effective band limitation as a result of the intermediate frequency filters and from the other unavoidable dead times of the signal processing components.

33. The scanning antenna diversity system according to claim 1, wherein the IF reception signal is digitalized in a digitally operating signal processing DSP, and that all the functions of the system are implemented by means of digital signal processes.

* * * * *